United States Patent
Ishii

(10) Patent No.: US 12,054,215 B2
(45) Date of Patent: Aug. 6, 2024

(54) FRONT FENDER

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 225 days.

(21) Appl. No.: 17/901,488

(22) Filed: Sep. 1, 2022

(65) Prior Publication Data

US 2023/0070742 A1     Mar. 9, 2023

(30) Foreign Application Priority Data

Sep. 9, 2021   (JP) ................... 2021-146870

(51) Int. Cl.
     *B62J 15/02*         (2006.01)
(52) U.S. Cl.
     CPC ..................... *B62J 15/02* (2013.01)
(58) Field of Classification Search
     CPC .................. B62J 15/00; B62J 15/02
     See application file for complete search history.

(56) References Cited

U.S. PATENT DOCUMENTS

| | | | | |
|---|---|---|---|---|
| 4,129,317 A | * | 12/1978 | Bell ......................... | B62K 3/10 |
| | | | | 280/281.1 |
| 5,975,548 A | * | 11/1999 | Galli ..................... | B62D 25/186 |
| | | | | 280/157 |
| 2004/0140644 A1 | * | 7/2004 | Kofuji .................... | B62K 25/16 |
| | | | | 280/276 |
| 2014/0131128 A1 | * | 5/2014 | Schuhmacher .......... | B62J 25/00 |
| | | | | 280/281.1 |
| 2016/0059921 A1 | * | 3/2016 | Kitayama ................ | B62J 15/00 |
| | | | | 280/304.3 |
| 2019/0118598 A1 | * | 4/2019 | Sasaki .................... | B62D 25/16 |
| 2020/0407006 A1 | * | 12/2020 | Kuwabara .............. | B62J 45/412 |
| 2022/0177043 A1 | * | 6/2022 | Bowen ................. | B62D 25/163 |
| 2023/0140031 A1 | * | 5/2023 | Watanabe ................ | B62J 45/42 |
| | | | | 73/146 |
| 2023/0192213 A1 | * | 6/2023 | Deguchi .................. | B62J 17/10 |
| | | | | 280/154 |

FOREIGN PATENT DOCUMENTS

| | | |
|---|---|---|
| EP | 3 476 706 A1 | 10/2018 |
| JP | 2016-49902 A | 4/2016 |

OTHER PUBLICATIONS

German Office Action dated Jan. 5, 2023, issued by the German Patent and Trademark Office in corresponding application DE 102022122679.4.

* cited by examiner

*Primary Examiner* — Erez Gurari
(74) *Attorney, Agent, or Firm* — Stein IP, LLC

(57) ABSTRACT

A front fender attached to a front fork of a straddle-type vehicle, the front fender includes a fender body covering an upper side of a front wheel supported by the front fork, a pair of fender bases extending from two side edges of the fender body to an axle, and a pair of fender covers attached to the pair offender bases. A pair of leg portions having hollow cross sections are constituted by the pair of fender bases and the pair of fender covers, and the fender body is supported by the pair of leg portions attached to the front fork.

6 Claims, 10 Drawing Sheets

FRONT FENDER

CROSS-REFERENCE TO RELATED APPLICATIONS

The disclosure of Japanese Patent Application No. 2021-146870 filed on Sep. 9, 2021, including specification, drawings and claims is incorporated herein by reference in its entirety.

BACKGROUND

The present invention relates to a front fender.

Front fenders made of resin are generally formed by injection molding. An example of this type of front fenders includes a front fender attached to a lower portion of a front fork (for example, see Patent Literature 1). The front fender described in Patent Literature 1 includes a fender body covering a front wheel from above and a pair of leg portions extending from two side edges of the fender body toward an axle of the front wheel. The fender body and the pair of leg portions are integrally molded. The pair of leg portions are disposed along the front fork, and lower portions of the pair of leg portions are attached to an axle bracket at the lower portion of the front fork.

Patent Literature 1: JP-A-2016-049902

SUMMARY

An aspect of the present invention provides a front fender attached to a front fork of a straddle-type vehicle. The front fender includes: a fender body covering an upper side of a front wheel supported by the front fork; a pair of fender bases extending from two side edges of the fender body to an axle; and a pair of fender covers attached to the pair of fender bases. A pair of leg portions having hollow cross sections are constituted by the pair of fender bases and the pair of fender covers, and the fender body is supported by the pair of leg portions attached to the front fork.

DESCRIPTION OF EMBODIMENTS

The front fender described in Patent Literature 1 has a problem in that the leg portions from the fender body to the attachment portion on the axle bracket are long and the rigidity is likely to decrease. Although it is conceivable to increase the thickness of the front fender or to increase the number of ribs of the front fender to increase the rigidity of the front fender, there are problems such as an increase in weight and sink marks during molding. In addition, since the fender body and the pair of leg portions are integrally molded, it is difficult to perform color coding during material coloring, and the design deteriorates.

The present invention is made in view of the above problem, and an object of the present invention is to provide a front fender that can ensure rigidity and improve design.

According to the front fender of the aspect of the present invention, the hollow cross sections of the pair of leg portions supporting the fender body are defined by the pair of fender bases and the pair of fender covers. The rigidity of the pair of leg portions can be ensured without thickening the pair of fender bases or the pair of fender covers or providing the pair of fender bases and the pair of fender covers with ribs. It is also possible to reduce the weight of the front fender and prevent sink marks during molding of the front fender. Further, since the fender body and the pair of fender covers are separate bodies, it is possible to color-code the fender body and the pair of fender covers during material coloring, thereby improving the design.

A front fender according to an aspect of the present invention is attached to a front fork of a straddle-type vehicle. A fender body of the front fender covers a front wheel supported by the front fork from above. A pair of fender bases extend from two side edges of the fender body toward an axle. A pair of fender covers are attached to the pair of fender bases. The pair of fender bases and the pair of fender covers constitute a pair of leg portions having hollow cross sections. The fender body is supported by the pair of leg portions attached to the front fork. Accordingly, the rigidity of the pair of leg portions can be ensured without thickening the pair of fender bases or the pair of fender covers or providing the pair of fender bases and the pair of fender covers with ribs. It is also possible to reduce the weight of the front fender and prevent sink marks during molding of the front fender. Further, since the fender body and the pair of fender covers are separate members, it is possible to color code the fender body and the pair of fender covers during material coloring, thereby improving the design.

EMBODIMENT

Figure 1:
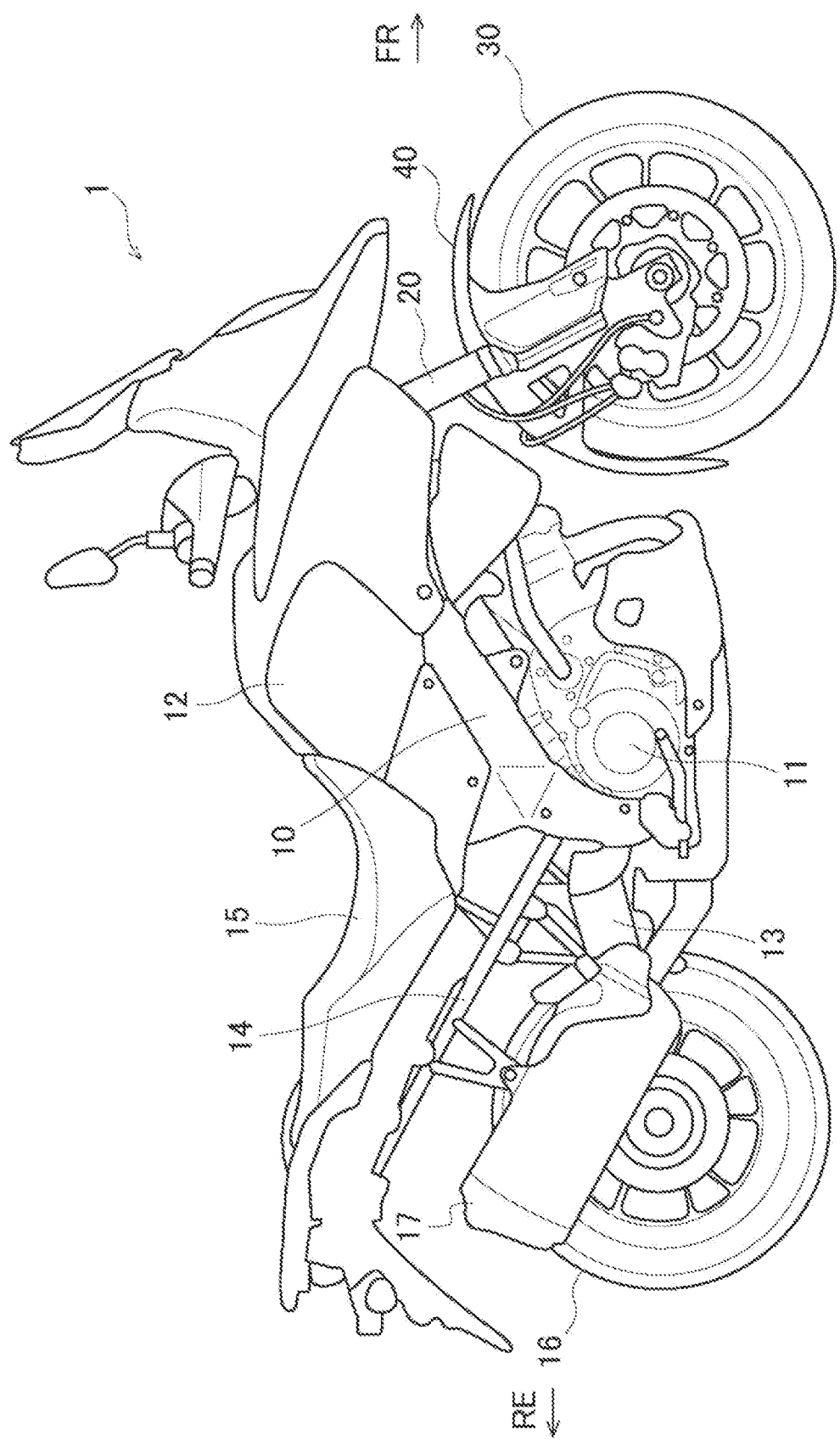
FIG. 1 is a right view of a straddle-type vehicle according to an embodiment.

Hereinafter, an embodiment will be described in detail with reference to the accompanying drawings. FIG. 1 is a right view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 uses a twin spar type vehicle body frame formed of an aluminum alloy. The vehicle body frame includes a pair of main frames 10 branching from a head pipe (not shown) to left and right and extending rearward while embracing an engine 11. A fuel tank 12 is supported from below on front sides of the pair of main frames 10. A swing arm 13 is swingably supported on rear sides of the pair of main frames 10. A pair of seat rails 14 extend rearward from the pair of main frames 10. A seat 15 is supported by the pair of seat rails 14 from below.

A front fork 20 is steerably supported on the head pipe by a steering shaft (not shown). A front wheel 30 is rotatably supported on a lower portion of the front fork 20. The swing arm 13 extends rearward from lower portions of the main frames 10. A rear wheel 16 is rotatably supported on a rear end of the swing arm 13. The engine 11 is coupled to the rear wheel 16 by a chain drive type transmission mechanism. Power from the engine 11 is transmitted to the rear wheel 16 by the transmission mechanism. A muffler 17 is disposed rearward of the engine 11. Exhaust gas from the engine 11 is discharged to the outside through the muffler 17.

A front fender 40 made of resin is attached to the front fork 20. A typical front fender includes a fender body covering a front wheel from above and a pair of leg portions supporting the fender body. The fender body and the pair of leg portions are integrally molded by injection molding. The pair of leg portions are attached to the vicinity of an axle of the front fork, and thus the leg portions are longer as the diameter of a tire of the front wheel is larger. The fender body may come into contact with the tire if the rigidity of the leg portions is not sufficiently ensured. In consideration of an increase in weight of the front fender, sink marks during molding, and the like, it is difficult to ensure the rigidity of the leg portions in terms of the thickness of the front fender.

In addition, coatings may crack due to flying stones regarding off-road vehicles, and thus the front fender often adopts material coloring instead of coating. For this reason, when the entire front fender is integrally molded, it is difficult to perform color coding, and the design deteriorates. Therefore, the front fender 40 according to the present embodiment is provided with a pair of leg portions 42 (see FIG. 2) extending from an attachment position on the front fork to an upper side of the front wheel 30. The pair of leg portions 42 are each molded into a hollow cross-sectional shape by two types of molded components to increase the rigidity. The design of the front fender 40 is improved by coloring the two types of molded components with a different color.

Figure 2:
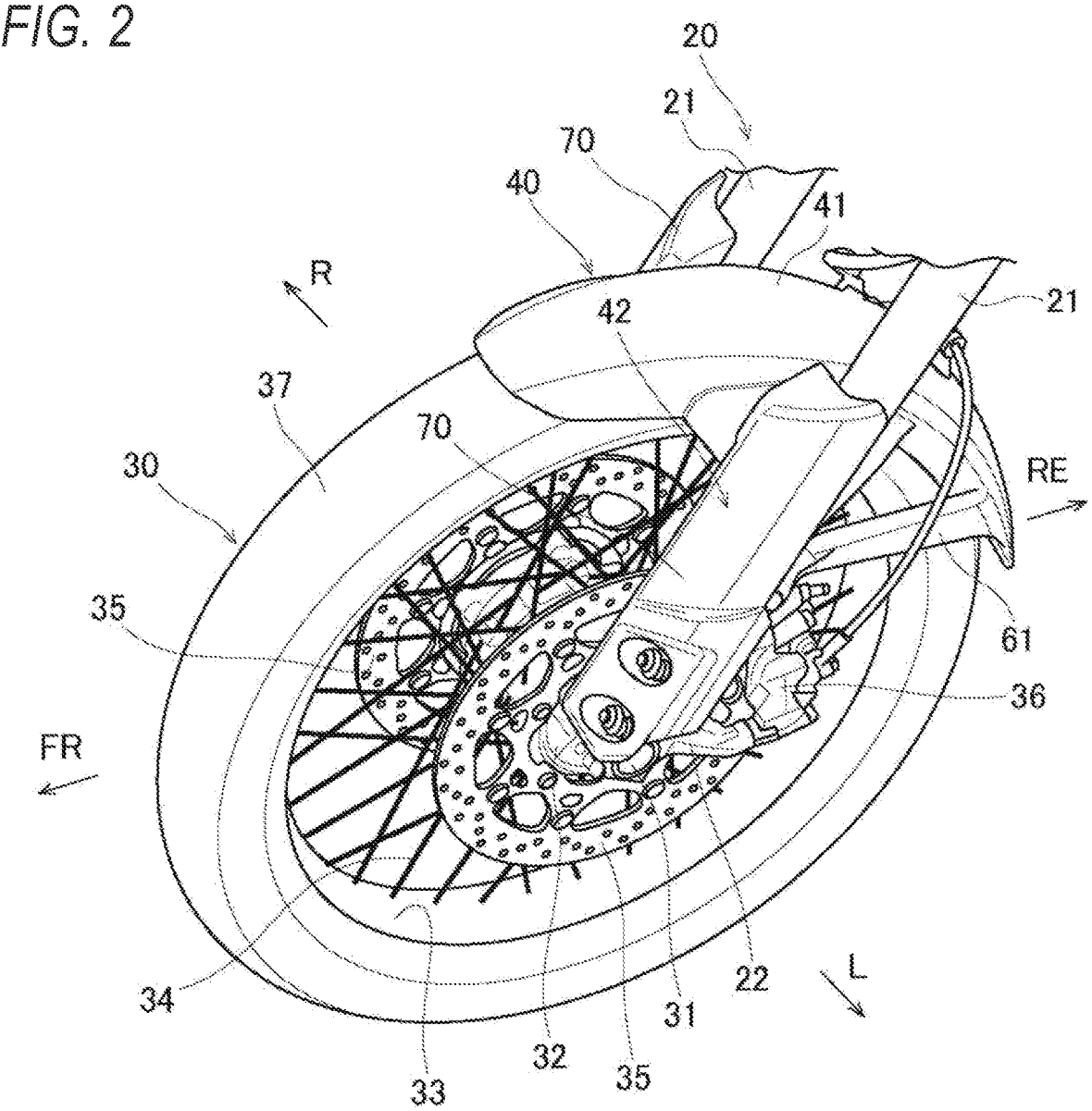
FIG. 2 is a perspective view of portions around a front wheel according to the embodiment.
Figure 3:
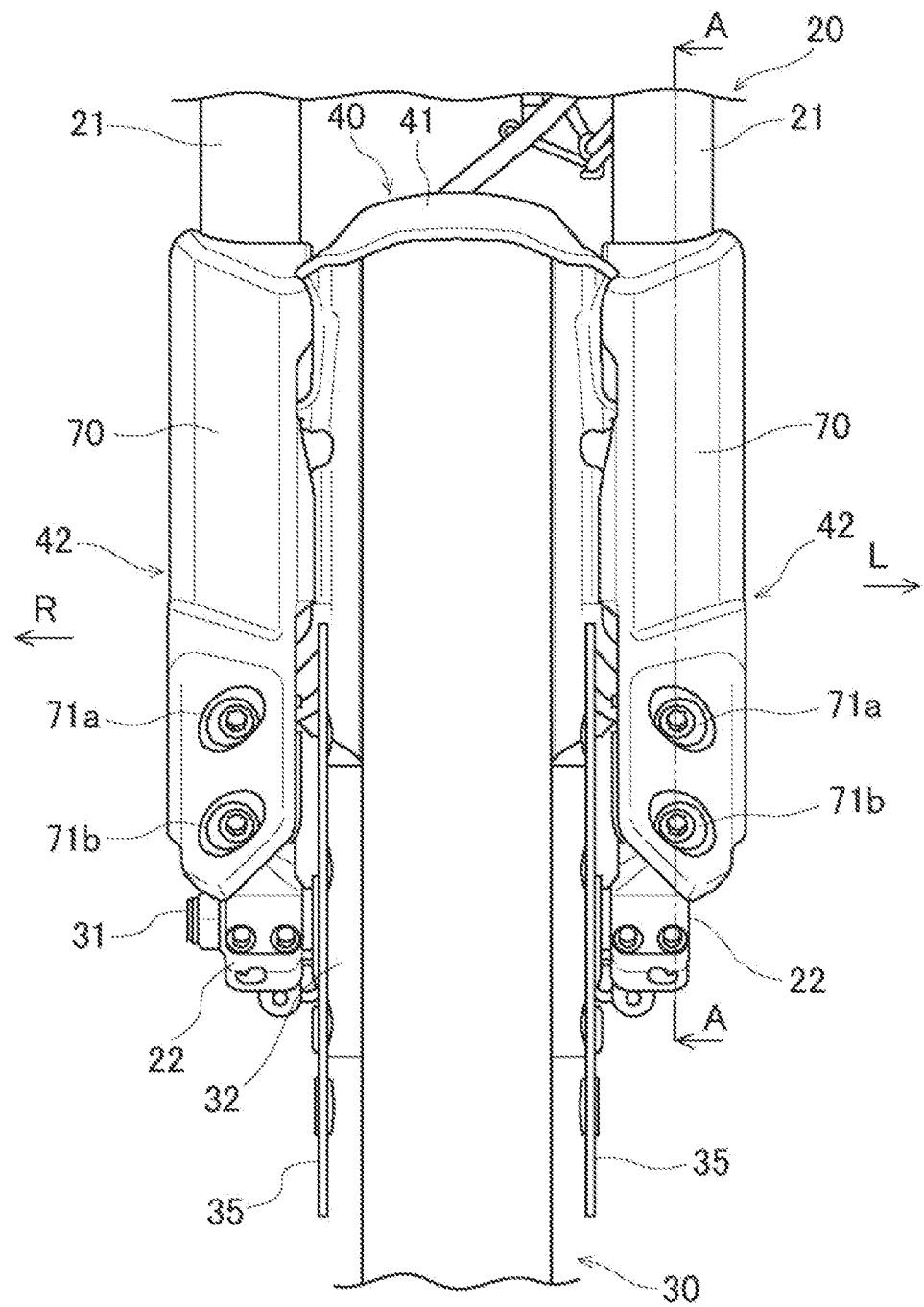
FIG. 3 is a front view of the portions around the front wheel according to the embodiment.
Figure 4:
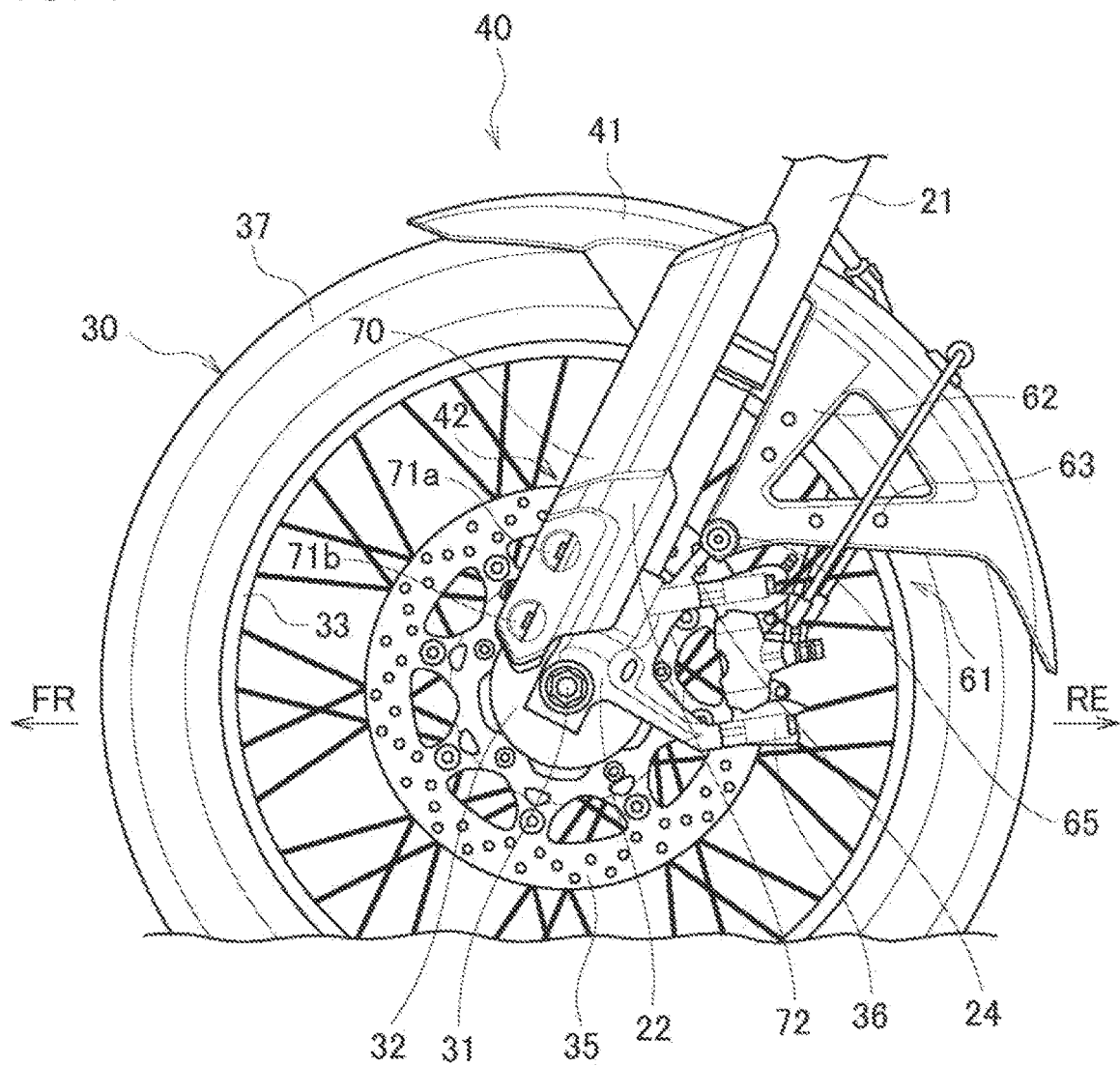
FIG. 4 is a left view of the portions around the front wheel according to the embodiment.
Figure 5:
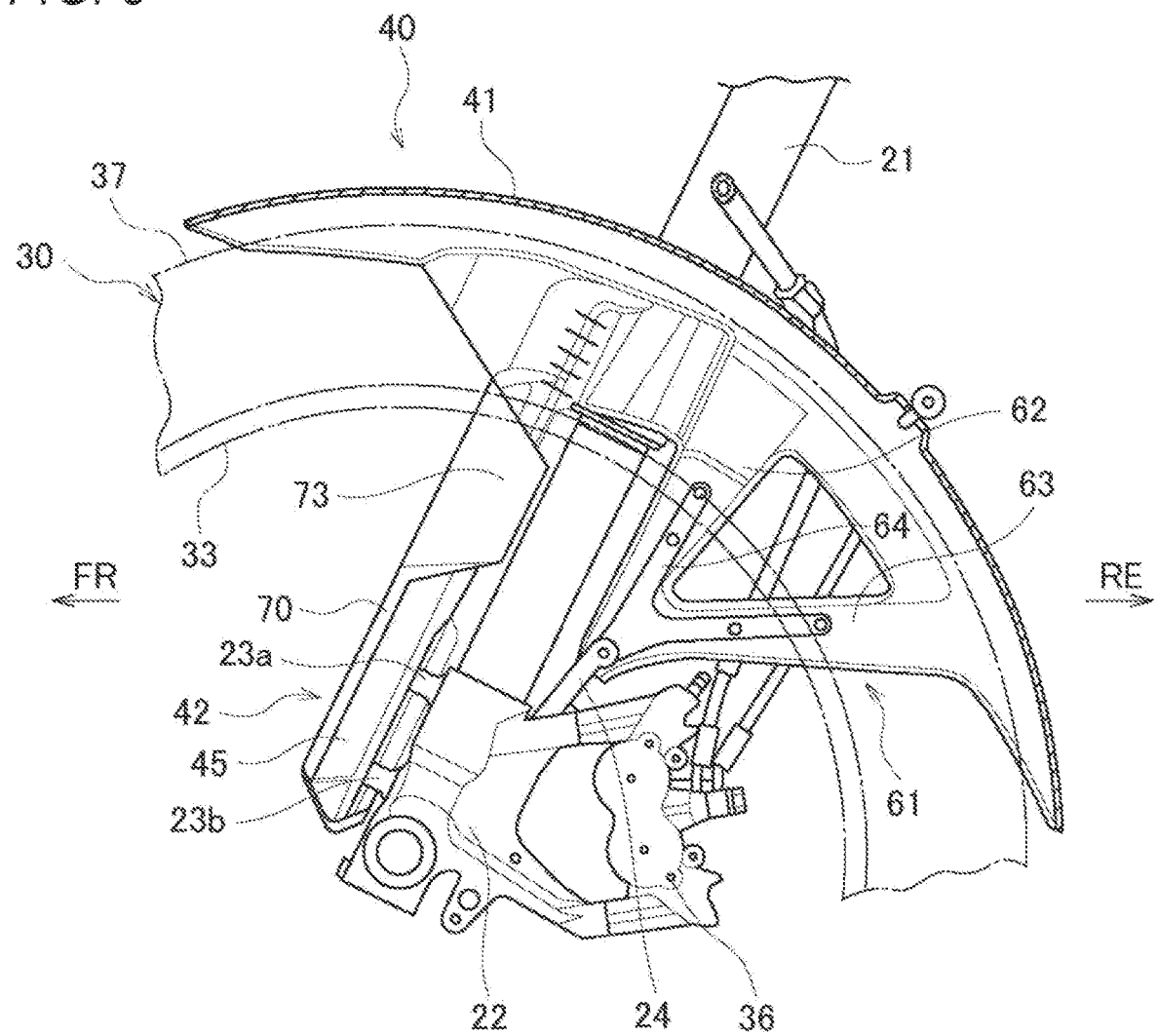
FIG. 5 is a side view of the portions around the front wheel according to the present embodiment as viewed from the inside.

Portions around the front wheel will be described with reference to FIGS. 2 to 5. FIG. 2 is a perspective view of the portions around the front wheel according to the embodiment. FIG. 3 is a front view of the portions around the front wheel according to the embodiment. FIG. 4 is a left view of the portions around the front wheel according to the embodiment. FIG. 5 is a side view of the portions around the front wheel according to the present embodiment as viewed from the inside. In FIG. 5, the front wheel is omitted for convenience of illustration.

As shown in FIGS. 2 and 3, an axle bracket 22 is provided on each of lower portions of a pair of fork tubes 21 of the front fork 20. The front wheel 30 is supported on the axle brackets 22 by an axle 31. The wheel of the front wheel 30 includes a tubular hub 32 into which the axle 31 is inserted, an annular rim 33 on which a tire 37 is mounted, and a plurality of spokes 34 coupling the hub 32 with the rim 33. A pair of annular plate-shaped brake discs 35 are fixed to two ends of the hub 32. A pair of brake calipers 36 that clamp the brake discs 35 are fixed to the axle brackets 22.

The front fender 40 made of resin is attached to the axle brackets 22 at the lower portion of the front fork 20. The front fender 40 is constituted by two types of molded components that are individually injection-molded. The molded component that is a base is obtained by integrally molding a fender body 41 that covers the upper side of the front wheel 30, a pair of fender bases 45 (see FIG. 5) forward of the pair of fork tubes 21, and a pair of fender support portions 61 rearward of the pair of fork tubes 21. The molded component that is an additional member is obtained by solely molding a pair of fender covers 70 that cover the pair of fender bases 45 from front.

As shown in FIGS. 3 to 5, the fender body 41 is disposed along an outer peripheral surface of the tire 37. The fender body 41 covers the outer peripheral surface of the tire 37 from above to constitute a mudguard surface. The pair of fender bases 45 extend from two front side edges of the fender body 41 toward the axle 31. The pair of fender covers 70 are attached to front surfaces of the pair of fender bases 45. The fender bases 45 and the fender covers 70 are disposed along the fork tubes 21. Each of the fender bases 45 has an L-shape by an inner wall and a rear wall. Each of the fender covers 70 is a curved plate covering the fender base 45 from front.

The fender base 45 and the fender cover 70 constitute the pillar shaped leg portion 42. The leg portion 42 has a hollow cross section by the L-shape of the fender base 45 and the curved shape of the fender cover 70, so that the weight of the leg portion 42 is reduced and the rigidity of the pair of leg portions 42 is increased. In particular, since the fender base 45 and the fender cover 70 are located side-by-side in a front-rear direction, the rigidity of the leg portion 42 against bending in the front-rear direction is increased. In this case, similarly to a normal front fender, the fender base 45 extending downward from the fender body 41 can be made long using a mold for front and rear removal.

The pair of fender support portions 61 extend from two rear side edges of the fender body 41 toward the axle brackets 22. Each of the fender support portions 61 is formed by coupling a first arm 62 disposed along the fork tube 21 with a second arm 63 extending substantially horizontally in a V shape. A reinforcing plate 64 having a V shape in a side view is attached to an inner surface of the fender support portion 61. The fender support portion 61 is reinforced from the inside by the reinforcing plate 64, so that the rigidity is increased. In this way, the rigidity of the leg portion 42 extending from a front side of the fender body 41 is increased, and the rigidity of the fender support portion 61 extending from a rear side of the fender body 41 is increased.

Parts of a lower portion of each of the fender covers 70 are caved in to reveal seat surfaces 71a, 71b. The axle bracket 22 is formed with attachment portions 23a, 23b corresponding to the seat surfaces 71a, 71b. The seat surfaces 71a, 71b are screwed to the attachment portions 23a, 23b through the fender base 45, so that the leg portion 42 is fixed to the axle bracket 22. A seat surface 65 is disposed at a top portion of the fender support portion 61. A stay 24 extends from the axle bracket 22 toward the top portion of the fender support portion 61. The seat surface 65 is screwed to a distal end portion of the stay 24, so that the fender support portion 61 is fixed to the axle bracket 22.

The front side of the fender body 41 is supported by the leg portions 42 attached to the axle brackets 22. The rear side of the fender body 41 is supported by the fender support portions 61 attached to the axle brackets 22. The fender body 41 is stably supported by the pair of leg portions 42 and the pair of fender support portions 61 having high rigidity, so that the fender body 41 is prevented from coming into contact with the tire 37 during traveling. Since the pair of leg portions 42 and the pair of fender support portions 61 are fixed to the axle brackets 22, the front fender 40 is moved integrally with the front wheel 30 in accordance with the movement of the front fork 20.

The pair of leg portions 42 cover the pair of fork tubes 21 from front, so that the pair of fork tubes 21 are protected by the pair of leg portions 42 having high rigidity (particularly, see FIG. 3). An outer edge of each of the fender covers 70 on an outer side in the axle direction extends rearward to reveal an outer protruding portion 72. A part of the fork tube 21 and a part of the axle bracket 22 are covered by the outer protruding portion 72 from the outer side in the axle direction (particularly, see FIG. 4). An inner edge of the fender cover 70 on an inner side in the axle direction extends rearward to reveal an inner protruding portion 73 (particularly, see FIG. 5). A part of the inner wall of the fender base 45 is covered by the inner protruding portion 73 from the inner side in the axle direction.

In a side view, a rear edge of the inner protruding portion 73 is located rearward of the rear wall of the fender base 45, and an upper portion of the inner protruding portion 73 overlaps the rim 33 of the front wheel 30 indicated by a dashed-and-dotted line. A joint between the fender cover 70 and the fender base 45 on an outer side of the rim 33 in the axle direction is covered by the inner protruding portion 73. Even when foreign matters such as muddy water are splashed up along the rim 33 in accordance with the rotation of the front wheel 30, the foreign matters are prevented from flying to the leg portion 42 from the rim 33 by the inner protruding portion 73. By providing the inner protruding portion 73 at the height of the rim 33, foreign matters are less likely to enter the inside of the leg portion 42 from the joint between the fender cover 70 and the fender base 45.

Figure 6:
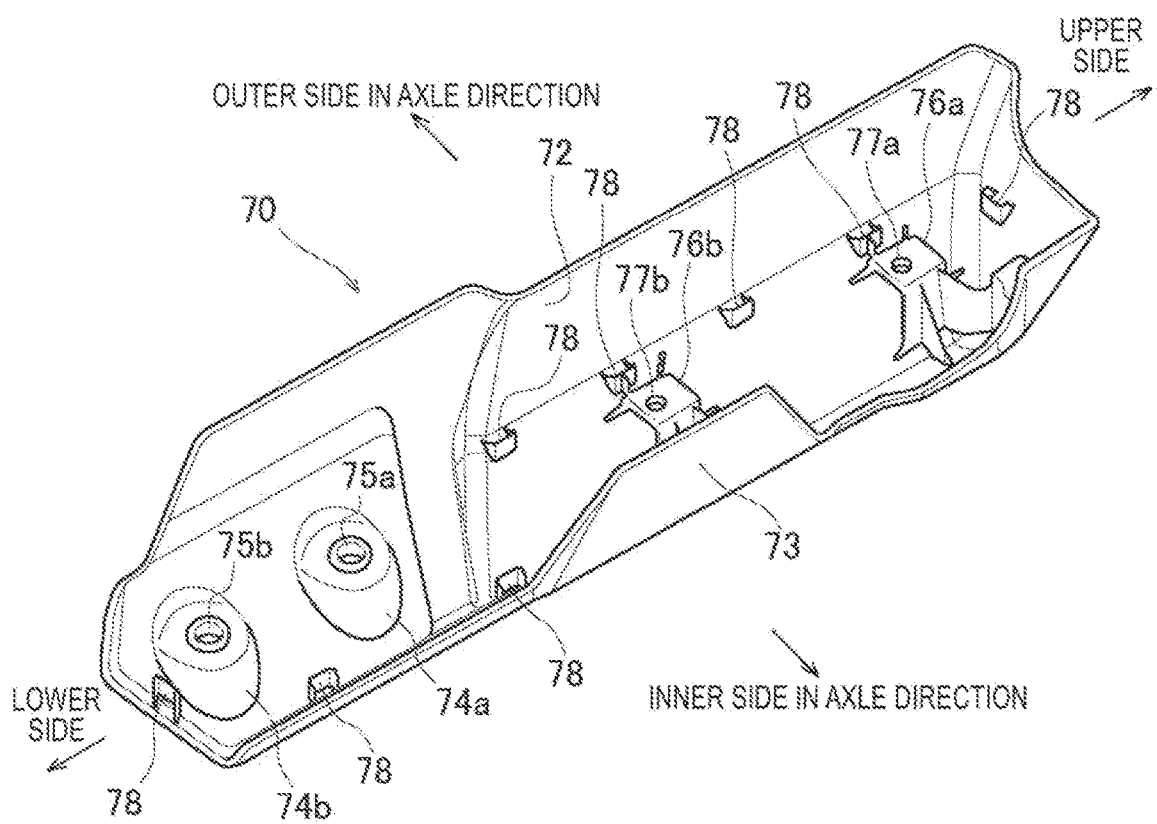
FIG. 6 is a perspective view of a fender cover according to the embodiment.
Figure 7:
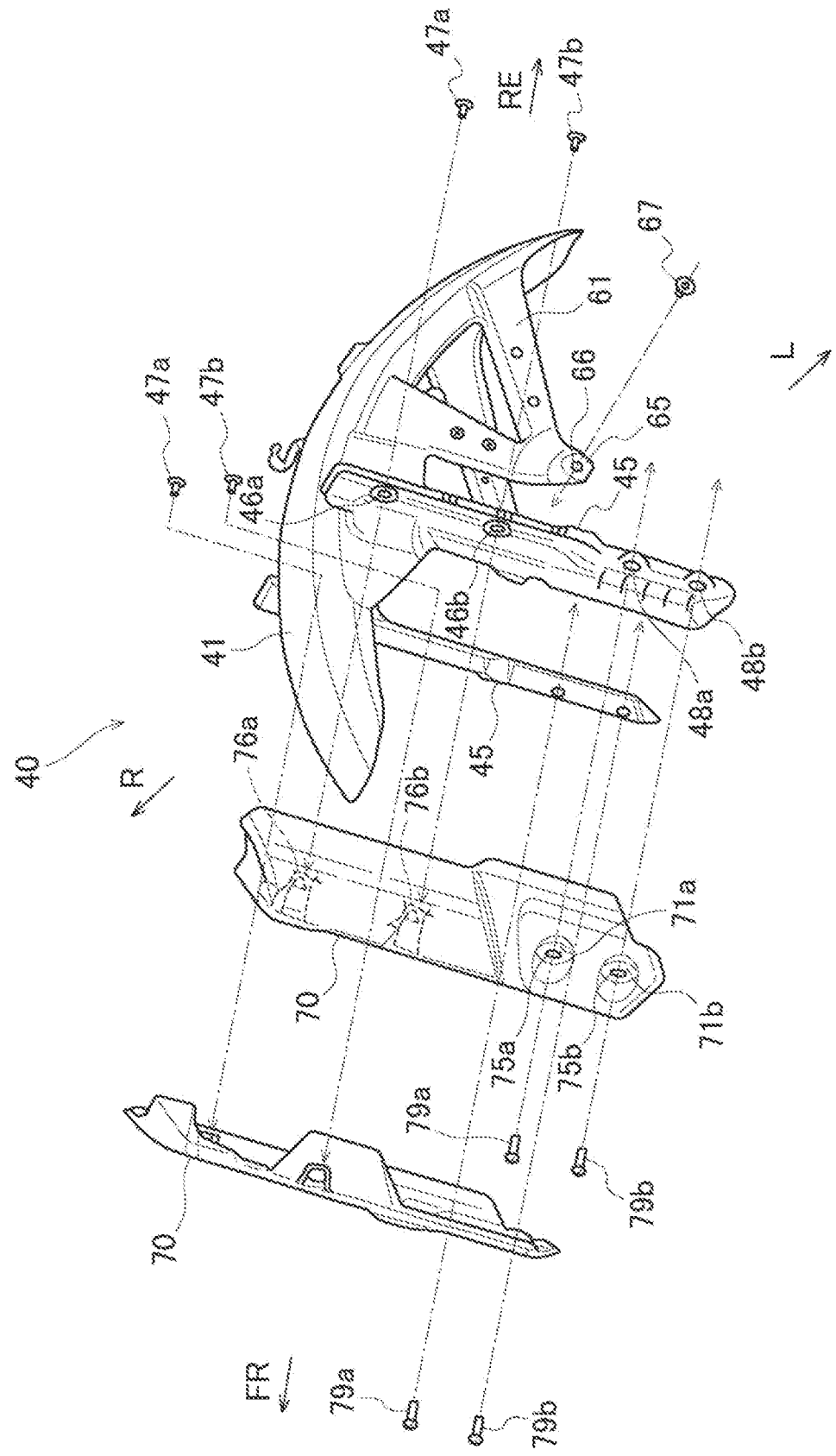
FIG. 7 is an exploded perspective view of the front fender according to the embodiment.

Assembly of the front fender will be described with reference to FIGS. 6 and 7. FIG. 6 is a perspective view of the fender cover according to the embodiment. FIG. 7 is an exploded perspective view of the front fender of the embodiment.

As shown in FIG. 6, the fender cover 70 has an elongated box shape that opens rearward. Bulging portions 74a, 74b are disposed on a lower side of an inner surface of the fender cover 70. Insertion holes 75a, 75b are formed in the bulging portions 74a, 74b. The bulging portions 74a, 74b constitute the seat surfaces 71a, 71b (see FIG. 4) in which parts of the outer surface of the fender cover 70 are caved in. Fixing brackets 76a, 76b are provided in the vicinity of the center and on an upper side of the inner surface of the fender cover 70. Insertion holes 77a, 77b are formed in the fixing brackets 76a, 76b. Weld nuts (not shown) are fixed to back surfaces of the fixing brackets 76a, 76b.

The fender cover 70 is provided with a plurality of positioning protrusions 78 that position the fender base 45 (see FIG. 6). The plurality of positioning protrusions 78, the fixing brackets 76a, 76b, and the bulging portions 74a, 74b constitute an abutting surface that receives the fender base 45 inside the fender cover 70. Since the fender base 45 is received by the fender cover 70, a hollow cross section is defined between the fender base 45 and the fender cover 70. As described above, the outer protruding portion 72 protrudes from the outer edge of the fender cover 70, and the inner protruding portion 73 protrudes from a central portion of the inner edge of the fender cover 70.

As shown in FIG. 7, insertion holes 46a, 46b are formed in the vicinity of the center and on an upper side of the fender base 45. Insertion holes 48a, 48b are formed on a lower side of the fender base 45. The insertion holes 46a, 46b of the fender base 45 correspond to the insertion holes 77a, 77b (see FIG. 6) of the fixing brackets 76a, 76b of the fender cover 70. The insertion holes 48a, 48b of the fender base 45 correspond to the insertion holes 75a, 75b of the seat surfaces 71a, 71b of the fender cover 70. When the front fender 40 is assembled, the pair of fender covers 70 are covered on the pair of fender bases 45 from front and the pair of fender covers 70 are positioned on the pair of fender bases 45.

At this time, the insertion holes 77a, 77b of the fixing brackets 76a, 76b of the fender cover 70 are aligned with the insertion holes 46a, 46b of the fender base 45, and the insertion holes 75a, 75b of the seat surfaces 71a, 71b of the fender cover 70 are aligned with the insertion holes 48a, 48b of the fender base 45. Bolts 47a, 47b are inserted into the insertion holes 46a, 46b from rear of the fender base 45. The bolts 47a, 47b are fixed to the weld nuts through the insertion holes 77a, 77b of the fixing brackets 76a, 76b. As a result, the fender cover 70 is attached to the vicinity of the center of the fender base 45 and to the upper side of the fender base 45.

Subsequently, the seat surfaces 71a, 71b of the fender cover 70 are aligned with the attachment portions 23a, 23b (see FIG. 5) of the axle bracket 22. Bolts 79a, 79b are inserted into the insertion holes 75a, 75b of the seat surfaces 71a, 71b from front of the fender cover 70. The bolts 79a, 79b are fixed to the attachment portions 23a, 23b of the axle bracket 22 through the insertion holes 48a, 48b of the fender base 45. Accordingly, the fender base 45 and the fender cover 70 are attached to the axle bracket 22 in two positions on the lower side. The fender base 45 and the fender cover 70 are combined to constitute the leg portion 42 (see FIG. 4) having a hollow cross section.

Further, an insertion hole 66 is formed in the seat surface 65 of the fender support portion 61. The seat surface 65 of the fender support portion 61 is aligned with the distal end portion of the stay 24 (see FIG. 4) of the axle bracket 22. A bolt 67 is inserted into the insertion hole 66 of the seat surface 65 from an outer side of the fender support portion 61 in the axle direction, and is fixed to a screw hole (not shown) in the distal end portion of the stay 24. Accordingly, the fender support portion 61 is attached to the stay 24 of the axle bracket 22. The pair of leg portions 42 and the pair of fender support portions 61 are attached to the pair of axle brackets 22, so that the front fender 40 is stably supported by the pair of axle brackets 22.

Figure 8:
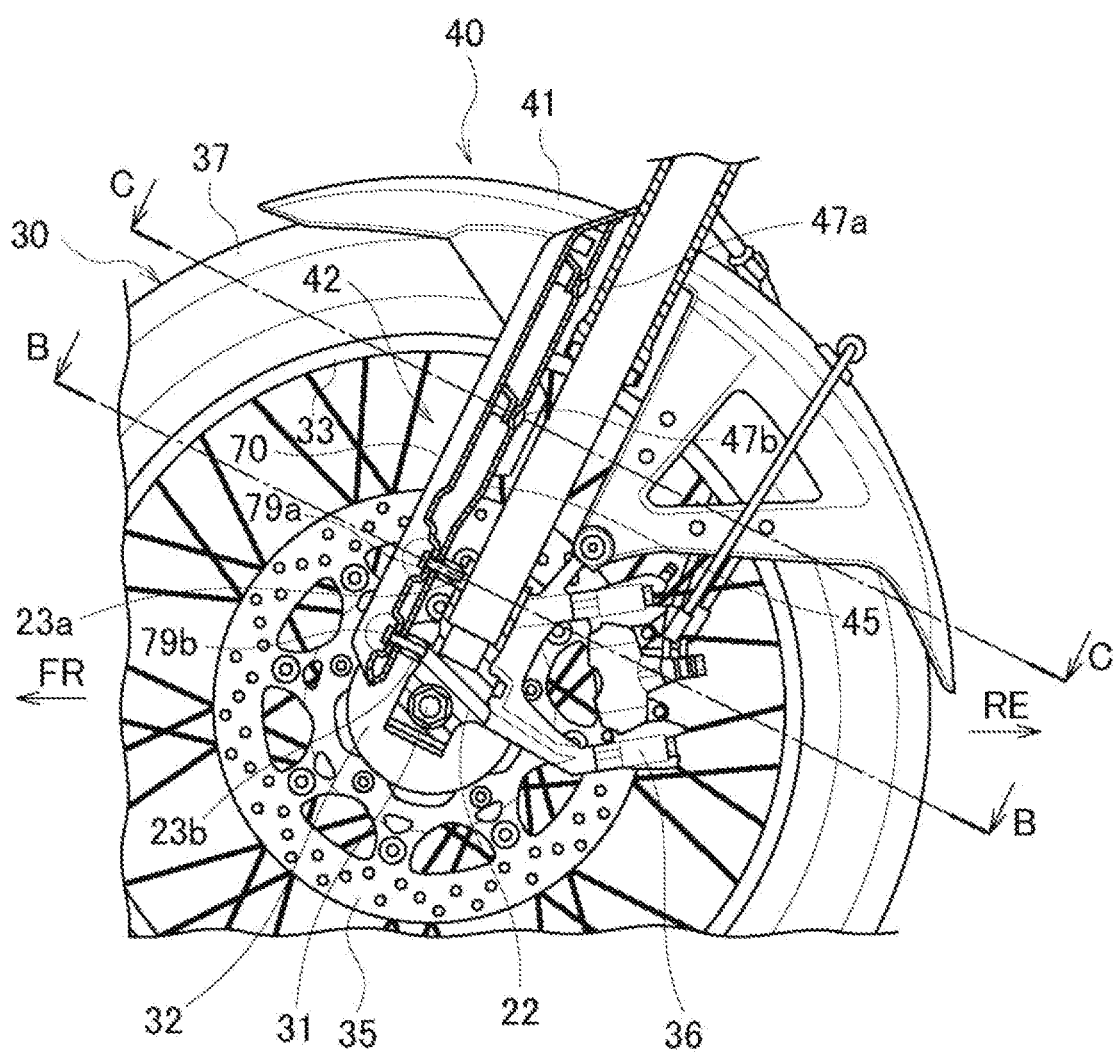
FIG. 8 is a cross-sectional view of a leg portion in FIG. 3 taken along a line A-A.
Figure 9:
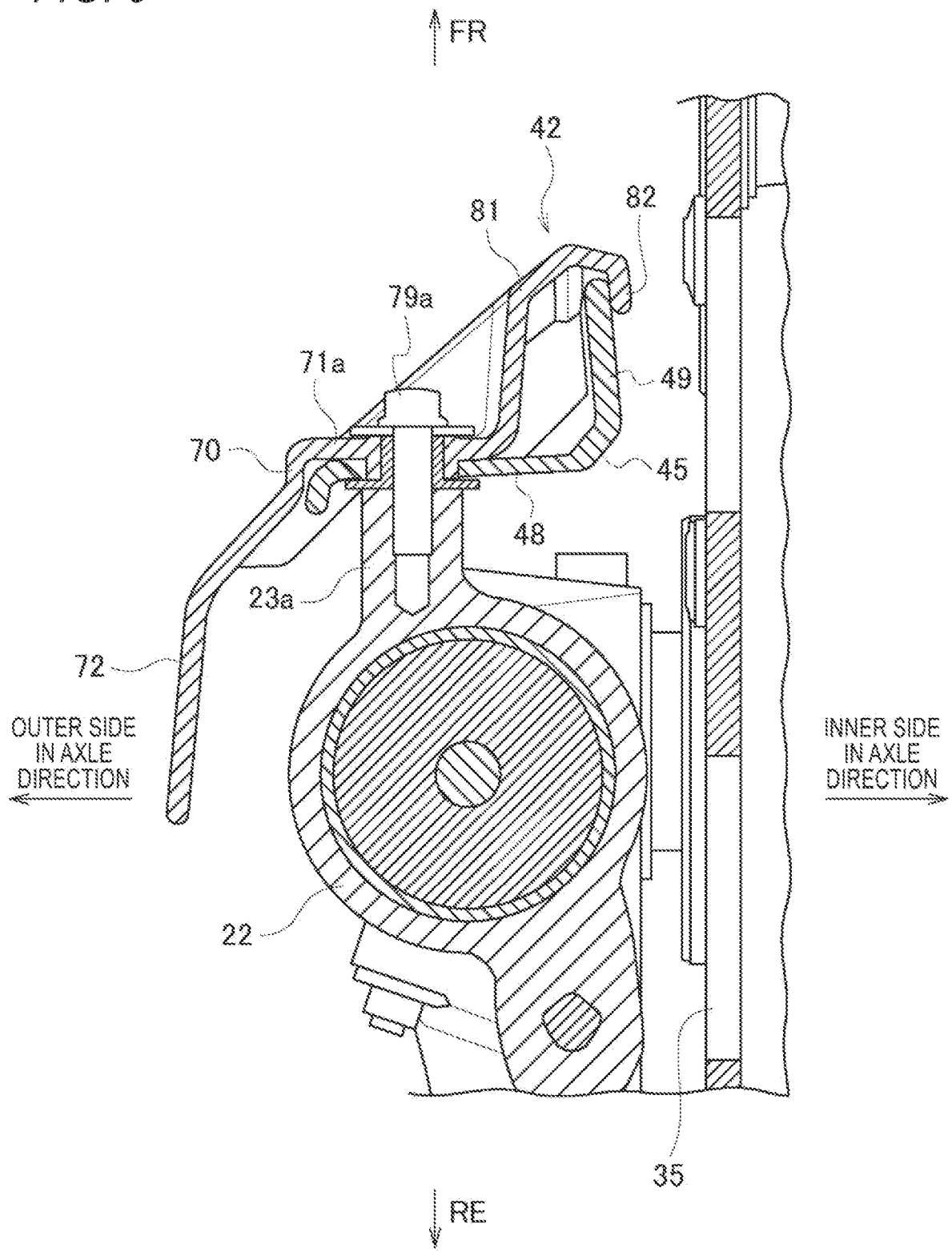
FIG. 9 is a cross-sectional view of the leg portion in FIG. 8 taken along a line B-B.
Figure 10:
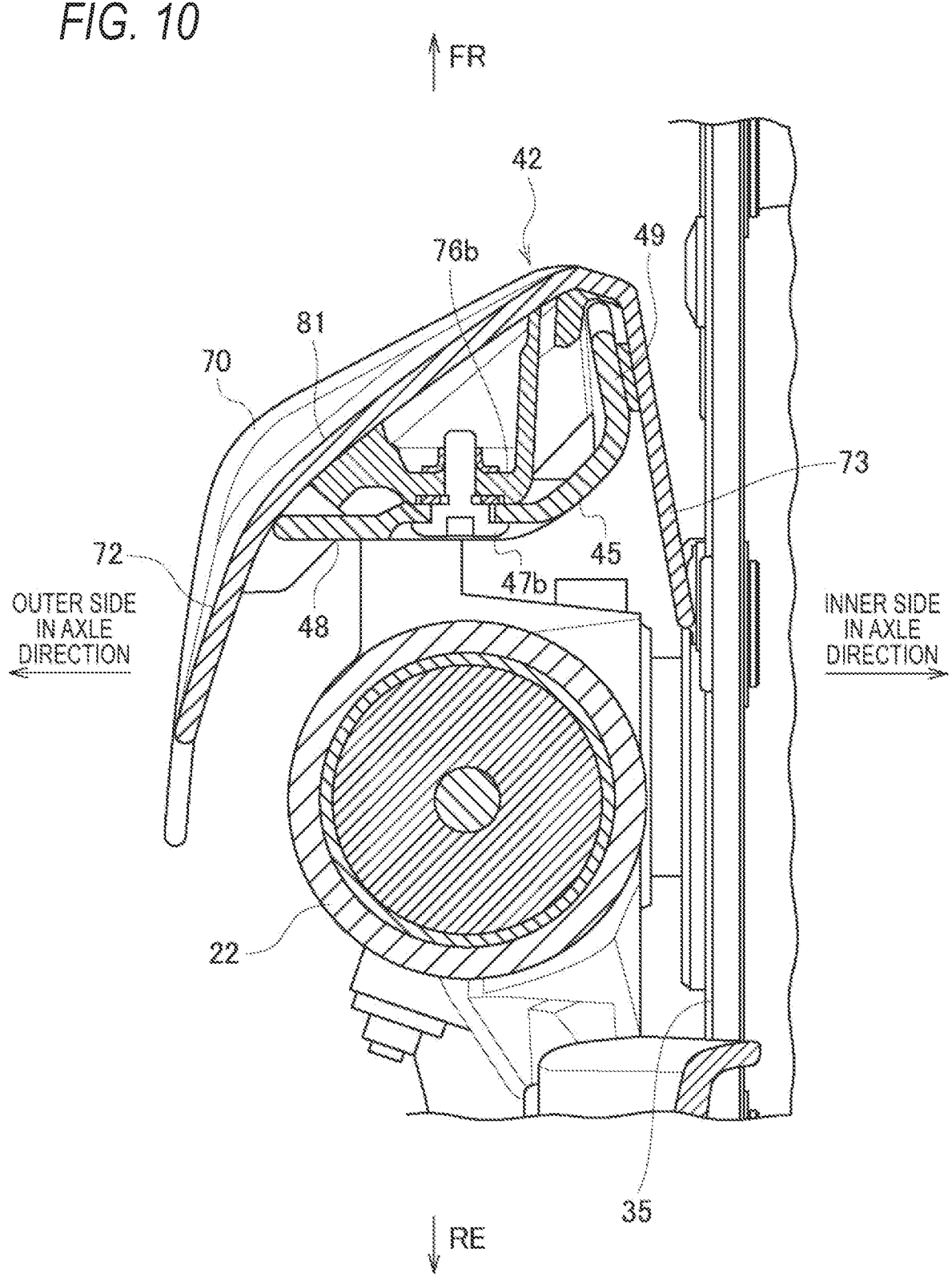
FIG. 10 is a cross-sectional view of the leg portion in FIG. 8 taken along a line C-C.

The hollow cross section of the leg portion will be described with reference to FIGS. 8 to 10. FIG. 8 is a cross-sectional view of the leg portion in FIG. 3 taken along a line A-A. FIG. 9 is a cross-sectional view of the leg portion in FIG. 8 taken along a line B-B. FIG. 10 is a cross-sectional view of the leg portion in FIG. 8 taken along a line C-C.

As shown in FIG. 8, the leg portion 42 has a columnar shape having a hollow cross section. The hollow cross section of the leg portion 42 extends upward from the attachment portion 23b of the axle bracket 22 to the height of the fender body 41. Since the axle bracket 22 has high rigidity, the overall rigidity of the axle bracket 22 and the leg portion 42 can be increased by fixing the lower portion of the leg portion 42 to the axle bracket 22. Since the hollow cross section of the leg portion 42 reaches the height of the fender body 41, it is possible to increase the overall rigidity of the leg portion 42 and increase the rigidity of a boundary portion between the fender body 41 and the leg portion 42 where stress is likely to be concentrated.

As described above, the lower end portion of the fender base 45 and the lower end portion of the fender cover 70 are attached to the attachment portions 23a, 23b of the axle bracket 22, and the upper end portion of the fender base 45 is attached to the upper end portion of the fender cover 70. Since the hollow cross section of the leg portion 42 extends from the lower end portion to the upper end portion of the fender cover 70, the rigidity of the leg portion 42 is increased at the upper and lower attachment portions, and the bolts 79a, 79b, 47a, 47b are prevented from loosening. In this way, since the leg portion 42 has a columnar shape having the hollow cross section, the rigidity of the leg portion 42 over the entire length is increased without increasing the thickness of the leg portion 42 or increasing the number of ribs of the leg portion 42.

As shown in FIG. 9, the seat surface 71a of the fender cover 70 is attached to the attachment portion 23a of the axle bracket 22 by the bolt 79a with a rear wall 48 of the fender base 45 interposed therebetween. Since the rigidity of the axle bracket 22 is high, the rigidity of the attachment portions of the fender cover 70 and the fender base 45 is ensured. The seat surface 71a of the fender cover 70 abuts against the rear wall 48 of the fender base 45, and a front end of an inner wall 49 of the fender base 45 abuts against a front wall 81 of the fender cover 70. A narrow hollow cross section is defined on an inner side of the fender cover 70 in the axle direction relative to the seat surface 71a to ensure the rigidity of the leg portion 42.

The inner edge of the fender cover 70 is bent rearward, so that the joint between the fender base 45 and the fender cover 70 on the inner side in the axle direction is covered by a bent portion 82 of the fender cover 70, thereby preventing foreign matters such as muddy water from entering the leg portion 42 from the joint on the inner side in the axle direction. The outer protruding portion 72 extends rearward from the outer edge of the fender cover 70, so that the joint between the fender base 45 and the fender cover 70 on the outer side in the axle direction is covered by the outer protruding portion 72, thereby preventing foreign matters from entering the inside of the leg portion 42 from the joint on the outer side in the axle direction. Further, the rigidity against bending in the front-rear direction is increased by the bent portion 82 and the outer protruding portion 72 of the fender cover 70.

As shown in FIG. 10, the rear wall 48 of the fender base 45 is attached to the fixing bracket 76b of the fender cover 70 by the bolt 47b. A side end of the rear wall 48 of the fender base 45 abuts against the front wall 81 of the fender cover 70, and a front end of the inner wall 49 of the fender base 45 abuts against the front wall 81 of the fender base 45. A wide hollow cross section is defined around the fixing bracket 76b to ensure the rigidity of the leg portion 42. In addition, since the fixing bracket 76b provided on the fender cover 70 abuts against the fender base 45, the front-rear distance between the fender cover 70 and the fender base 45 is maintained.

The inner protruding portion 73 extends rearward from the inner edge of the fender cover 70, so that the joint between the fender base 45 and the fender cover 70 on the inner side in the axle direction is covered by the inner protruding portion 73. As described above, even when the foreign matters are splashed up along the rim 33 (see FIG. 5) of the front wheel 30, the foreign matters are prevented by the inner protruding portion 73 from entering the leg portion 42 from the joint on the inner side in the axle direction. The joint between the fender base 45 and the fender cover 70 on the outer side in the axle direction is covered by the outer protruding portion 72, so that the foreign matters are prevented from entering the leg portion 42 from the joint on the outer side in the axle direction. In addition, the rigidity against bending in the front-rear direction is increased by the inner protruding portion 73 and the outer protruding portion 72 of the fender cover 70.

According to the present embodiment described above, the hollow cross sections of the pair of leg portions 42 supporting the fender body 41 are defined by the pair of fender bases 45 and the pair of fender covers 70. The rigidity of the pair of leg portions 42 can be ensured without thickening the pair of fender bases 45 or the pair of the fender cover 70 or providing the pair of fender bases 45 and the fender cover 70 with ribs. It is also possible to reduce the weight of the front fender 40 and to prevent sink marks during molding of the front fender 40. Further, since the fender body 41 and the pair of fender covers 70 are separate bodies, it is possible to color-code the fender body 41 and the pair of fender covers 70 during material coloring, thereby improving the design.

In the present embodiment, the fender cover is attached to the fender base while covering the fender base from front. Alternatively, the fender cover may be attached to the fender base so as to form the hollow cross section. For example, the fender cover may be attached to the fender base such that the fender cover covers the fender base from one side, and the fender cover may be attached to the fender base such that the fender cover covers the fender base from rear.

Further, in the present embodiment, the hollow cross section of the leg portion extends upward from the attachment portion of the axle bracket to the height of the fender body. Alternatively, the hollow cross section of the leg portion does not need to be formed over the entire length. At least a part of the leg portion may have a hollow cross section.

In the present embodiment, the outer protruding portion and the inner protruding portion are disposed on the fender cover. Alternatively, the outer protruding portion and the inner protruding portion may not be disposed on the fender cover as long as the hollow cross section can be defined by the fender cover and the fender base.

In the present embodiment, the fender cover and the fender base are fixed by bolts. Alternatively, the fixing direction of the fender cover and the fender base is not particularly limited. For example, the fender cover and the fender base may be fixed by an adhesive.

Further, the front fender is not limited to the straddle-type vehicle shown in the drawings, and may be applied to other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, a front fender (40) according to the present embodiment is attached to a front fork (20) of a straddle-type vehicle (1). The front fender includes: a fender body (41) covering an upper side of a front wheel (30) supported by the front fork; a pair of fender bases (45) extending from two side edges of the fender body to an axle (31); and a pair of fender covers (70) attached to the pair of fender bases. A pair of leg portions (42) having hollow cross sections are constituted by the pair of fender bases and the pair of fender covers, and the fender body is supported by the pair of leg portions attached to the front fork. According to this configuration, the hollow cross sections of the pair of leg portions supporting the fender body are defined by the pair of fender bases and the pair of fender covers. The rigidity of the pair of leg portions can be ensured without thickening the pair of fender bases or the pair of fender covers or providing the pair of fender bases and the pair of fender covers with ribs. It is also possible to reduce the weight of the front fender and prevent sink marks during molding of the front fender. Further, since the fender body and the pair of fender covers are separate members, it is possible to color code the fender body and the pair of fender covers during material coloring, thereby improving the design.

In the front fender according to the present embodiment, the pair of leg portions cover the front fork from front, and the pair of fender bases and the pair of fender covers are located side-by-side in a front-rear direction. According to this configuration, the front fork can be protected by the pair of leg portions having high rigidity. Since the fender covers and the fender bases are disposed side-by-side in the front-rear direction so as to form the hollow cross sections, it is possible to increase the rigidity of the pair of leg portions against bending in the front-rear direction.

In the front fender according to the present embodiment, attachment portions (23a, 23b) to which the pair of leg portions are attached are disposed at a lower portion of the front fork, and the hollow cross sections of the pair of leg portions extend upward from the attachment portions. According to this configuration, the rigidity of the pair of leg portions above the attachment portions of the front fork can be increased.

In the front fender according to the present embodiment, lower end portions of the pair of fender bases and lower end portions of the pair of fender covers are attached to the attachment portions, upper end portions of the pair of fender covers are attached to upper end portions of the pair of fender bases, and the hollow cross sections of the pair of leg portions extend from the lower end portions of the pair of fender bases to the upper end portions of the pair of fender bases. According to this configuration, the overall rigidity of the pair of leg portions is increased, and the rigidity of the leg portions is increased at the upper and lower attachment portions, thereby preventing loosening of attachment members.

In the front fender according to the present embodiment, the hollow cross sections of the pair of leg portions extend to a height of the fender body. According to this configuration, it is possible to increase the rigidity of a boundary portion between the fender body and the pair of leg portions on which stress is likely to be concentrated.

In the front fender according to the present embodiment, the pair of fender covers include inner protruding portions (73) covering a part of the pair of fender bases from an inner side in an axle direction, and the inner protruding portions overlap a rim (33) of the front wheel in a side view. According to this configuration, since the inner protruding portions of the fender covers are located on an outer side of the rim in the axle direction, foreign matters flying along the rim are less likely to enter from joints between the fender covers and the fender bases.

Although the present embodiment has been described, a part or all of the above-described embodiment and modifications may be combined as another embodiment.

The technique of the present invention is not limited to the above-described embodiment, and various changes, substitutions, and modifications may be made without departing from the spirit of the technical idea of the present invention. The present invention may be implemented by other methods as long as the technical idea can be implemented by the methods through advance of the technique or other derivative techniques. Therefore, the scope of the claims covers all embodiments that may be included within the scope of the technical idea.

What is claimed is:

1. A front fender attached to a front fork of a straddle-type vehicle, the front fender comprising:
    a fender body covering an upper side of a front wheel supported by the front fork;
    a pair of fender bases extending from two side edges of the fender body to an axle; and
    a pair of fender covers attached to the pair of fender bases,
    wherein a pair of leg portions having hollow cross sections are constituted by the pair of fender bases and the pair of fender covers, and the fender body is supported by the pair of leg portions attached to the front fork.
2. The front fender according to claim 1,
    wherein the pair of leg portions cover the front fork from front, and
    wherein the pair of fender bases and the pair of fender covers are located side-by-side in a front-rear direction.
3. The front fender according to claim 1,
    wherein attachment portions to which the pair of leg portions are attached are disposed at a lower portion of the front fork, and
    wherein the hollow cross sections of the pair of leg portions extend upward from the attachment portions.
4. The front fender according to claim 3,
    wherein lower end portions of the pair of fender bases and lower end portions of the pair of fender covers are attached to the attachment portions, and upper end portions of the pair of fender covers are attached to upper end portions of the pair of fender bases, and
    wherein the hollow cross sections of the pair of leg portions extend from the lower end portions of the pair of fender bases to the upper end portions of the pair of fender bases.
5. The front fender according to claim 3,
    wherein the hollow cross sections of the pair of leg portions extend to a height of the fender body.
6. The front fender according to claim 1,
    wherein the pair of fender covers include inner protruding portions covering a part of the pair of fender bases from an inner side in an axle direction, and the inner protruding portions overlap a rim of the front wheel in a side view.

* * * * *